(12) United States Patent
Aten et al.

(10) Patent No.: US 9,765,729 B2
(45) Date of Patent: Sep. 19, 2017

(54) THRUST REVERSER FAN RAMP WITH BLOCKER DOOR POCKET

(71) Applicants: Michael Aten, San Diego, CA (US); Milan Mitrovic, Del Mar, CA (US)

(72) Inventors: Michael Aten, San Diego, CA (US); Milan Mitrovic, Del Mar, CA (US)

(73) Assignee: Rohr, Inc., Chula Vista, CA (US)

( * ) Notice: Subject to any disclaimer, the term of this patent is extended or adjusted under 35 U.S.C. 154(b) by 310 days.

(21) Appl. No.: 14/056,629

(22) Filed: Oct. 17, 2013

(65) Prior Publication Data
US 2015/0107221 A1     Apr. 23, 2015

(51) Int. Cl.
*F02K 1/72*     (2006.01)
*F02K 1/70*     (2006.01)
*F02K 1/62*     (2006.01)

(52) U.S. Cl.
CPC .............. *F02K 1/72* (2013.01); *F02K 1/625* (2013.01); *F02K 1/70* (2013.01); *F05D 2260/97* (2013.01)

(58) Field of Classification Search
CPC ..... F02K 1/68; F02K 1/70; F02K 1/72; F02K 1/766; F02K 1/805; F02K 1/60; F02K 1/605; F02K 1/62; F02K 1/625
See application file for complete search history.

(56) References Cited

U.S. PATENT DOCUMENTS

| 4,914,905 | A | * | 4/1990 | Dubois | F02K 1/70 |
| | | | | | 239/265.29 |
| 5,309,711 | A | * | 5/1994 | Matthias | F02K 1/72 |
| | | | | | 239/265.29 |
| 5,806,302 | A | | 9/1998 | Cariola et al. | |
| 5,826,823 | A | | 10/1998 | Lymons et al. | |
| 6,293,495 | B1 | | 9/2001 | Aten et al. | |
| 6,546,715 | B1 | | 4/2003 | Blevins et al. | |
| 8,025,499 | B2 | | 9/2011 | Hubert et al. | |
| 8,091,335 | B2 | | 1/2012 | Sternberger | |
| 8,109,466 | B2 | * | 2/2012 | Aten | F02K 1/625 |
| | | | | | 239/265.31 |
| 8,394,315 | B2 | | 3/2013 | Hubert et al. | |
| 2004/0068978 | A1 | * | 4/2004 | Lair | F02K 1/70 |
| | | | | | 60/226.2 |

(Continued)

FOREIGN PATENT DOCUMENTS

FR     2146109     3/1973
FR     2934327     1/2010

OTHER PUBLICATIONS

EP search report for EP14188866.9 dated Mar. 19, 2015.

*Primary Examiner* — Andrew Nguyen
(74) *Attorney, Agent, or Firm* — O'Shea Getz P.C.

(57) ABSTRACT

A fan ramp for use in a thrust reverser portion of a nacelle is disclosed. The nacelle is included in a propulsion system. The fan ramp extends circumferentially about an axial fan ramp centerline. The fan ramp includes a forward edge, an aft edge, and a first blocker door pocket. The forward edge is disposed proximate an aft end of a fan case. The fan case at least partially surrounds a fan section of a gas turbine engine. The aft edge is disposed proximate a forward end of an array of cascades. The array of cascades is operable to permit a bypass airstream to pass there through during a thrust reversing operation. The first blocker door pocket is operable to receive at least a portion of a forward edge of a first blocker door included in the nacelle.

15 Claims, 6 Drawing Sheets

(56) References Cited

U.S. PATENT DOCUMENTS

| | | | |
|---|---|---|---|
| 2005/0151012 A1* | 7/2005 | Lair | F02K 1/70 244/110 B |
| 2010/0212286 A1* | 8/2010 | West | F02K 1/32 60/226.2 |
| 2011/0030338 A1* | 2/2011 | Vauchel | F02K 1/1261 60/226.2 |
| 2011/0174899 A1* | 7/2011 | Vauchel | B64D 29/06 239/265.11 |
| 2013/0092755 A1 | 4/2013 | Aten et al. | |
| 2013/0193224 A1 | 8/2013 | Aten et al. | |

\* cited by examiner

THRUST REVERSER FAN RAMP WITH BLOCKER DOOR POCKET

BACKGROUND

1. Technical Field

Aspects of the present invention relate to a propulsion system nacelle that includes a thrust reverser, and more particularly relate to a propulsion system nacelle that includes a thrust reverser fan ramp.

2. Background Information

It is known to provide a propulsion system that includes, for example, an engine (e.g., a gas turbine engine), a nacelle that at least partially surrounds the engine, and a pylon that connects the engine and the nacelle to a vehicle (e.g., an aircraft). In some instances, the nacelle includes a thrust reverser; the thrust reverser includes a plurality of blocker doors and a fan ramp aerodynamic surface; each of the plurality of blocker doors are movable between a stowed position and a deployed position; the blocker doors and the fan ramp aid in guiding an airstream to make a radially outward turn through an array of cascades when the blocker doors are disposed in their respective deployed positions during a thrust reversing operation; and a forward edge of each of the blocker doors abuts the fan ramp when the blocker doors are in their respective stowed positions. In some instances, there can be one or more small gaps that extend between the fan ramp and the forward edge of each blocker door when the blocker doors are in their respective stowed positions, and the presence of such gaps can cause increased drag and reduced optimal airstream paths. In some instances, the blocker doors are shaped differently from their optimal shape so as to reduce or eliminate such gaps. Aspects of the present invention are directed to these and other problems.

SUMMARY OF ASPECTS OF THE INVENTION

According to an aspect of the present invention, a fan ramp for use in a thrust reverser portion of a nacelle is provided. The nacelle is included in a propulsion system. The fan ramp extends circumferentially about an axial fan ramp centerline. The fan ramp includes a forward edge, an aft edge, and a first blocker door pocket. The forward edge is disposed proximate an aft end of a fan case. The fan case at least partially surrounds a fan section of a gas turbine engine. The aft edge is disposed proximate a forward end of an array of cascades. The array of cascades is operable to permit a bypass airstream to pass there through during a thrust reversing operation. The first blocker door pocket is operable to receive at least a portion of a forward edge of a first blocker door included in the nacelle.

According to another aspect of the present invention, a thrust reversing nacelle for a turbofan propulsion system is provided. The thrust reversing nacelle extends circumferentially about an axial centerline and includes an array of cascades, a translating structure, a blocker door, and a fan ramp. The array of cascades extends circumferentially about the axial centerline. The translating structure is operable to be moved in an axial direction between a stowed position, in which the translating structure blocks a bypass airstream from passing from a bypass duct through the array of cascades, and a deployed position, in which the translating structure permits the bypass airstream to pass from the bypass duct through the array of cascades. The blocker door is pivotally mounted to the translating structure, and is operable to be moved between a stowed position, in which the blocker door is positioned adjacent to the translating structure and is extending generally parallel to the axial centerline, and a deployed position, in which the blocker door is positioned away from the translating structure and is extending generally perpendicular to the axial centerline to aid in guiding the bypass airstream from the bypass duct through the array of cascades. The fan ramp is operable to aid in guiding the bypass airstream from the bypass duct through the array of cascades when the translating structure and the blocker door are in their respective stowed positions. The fan ramp includes a blocker door pocket operable to receive at least a portion of a forward edge of the blocker door.

According to an alternative or additional aspect of the present invention, the fan ramp is an aerodynamic surface that is active during the thrust reversing operation.

According to an alternative or additional aspect of the present invention, the fan ramp is exposed to a bypass airstream passing through a bypass duct of the propulsion system during the thrust reversing operation.

According to an alternative or additional aspect of the present invention, the fan ramp aids in guiding the bypass airstream to make a radially outward turn from the bypass duct through the array of cascades during the thrust reversing operation.

According to an alternative or additional aspect of the present invention, the fan ramp centerline is aligned with an axial centerline of a gas turbine engine included in the propulsion system.

According to an alternative or additional aspect of the present invention, the first blocker door pocket is operable to receive a center portion of the forward edge of the first blocker door.

According to an alternative or additional aspect of the present invention, the first blocker door pocket is operable to receive at least substantially all of the forward edge of the first blocker door.

According to an alternative or additional aspect of the present invention, the forward edge of the first blocker door is convexly curved.

According to an alternative or additional aspect of the present invention, the first blocker door pocket is a depression extending in a radially outward direction relative to the fan ramp centerline.

According to an alternative or additional aspect of the present invention, the first blocker door pocket is a depression extending in an axially forward direction relative to the fan ramp centerline.

According to an alternative or additional aspect of the present invention, the fan ramp further includes a second blocker door pocket circumferentially spaced from the first blocker door pocket, the second blocker door pocket being operable to receive at least a portion of a forward edge of a second blocker door included in the nacelle.

According to an alternative or additional aspect of the present invention, the fan ramp extends between a forward fan ramp edge and an aft fan ramp edge, wherein the forward fan ramp edge is disposed proximate an aft end of a fan case and the aft fan ramp edge is disposed proximate a forward end of an array of cascades.

These and other aspects of the present invention will become apparent in light of the drawings and detailed description provided below.

DETAILED DESCRIPTION OF ASPECTS OF THE INVENTION

Figure 1:
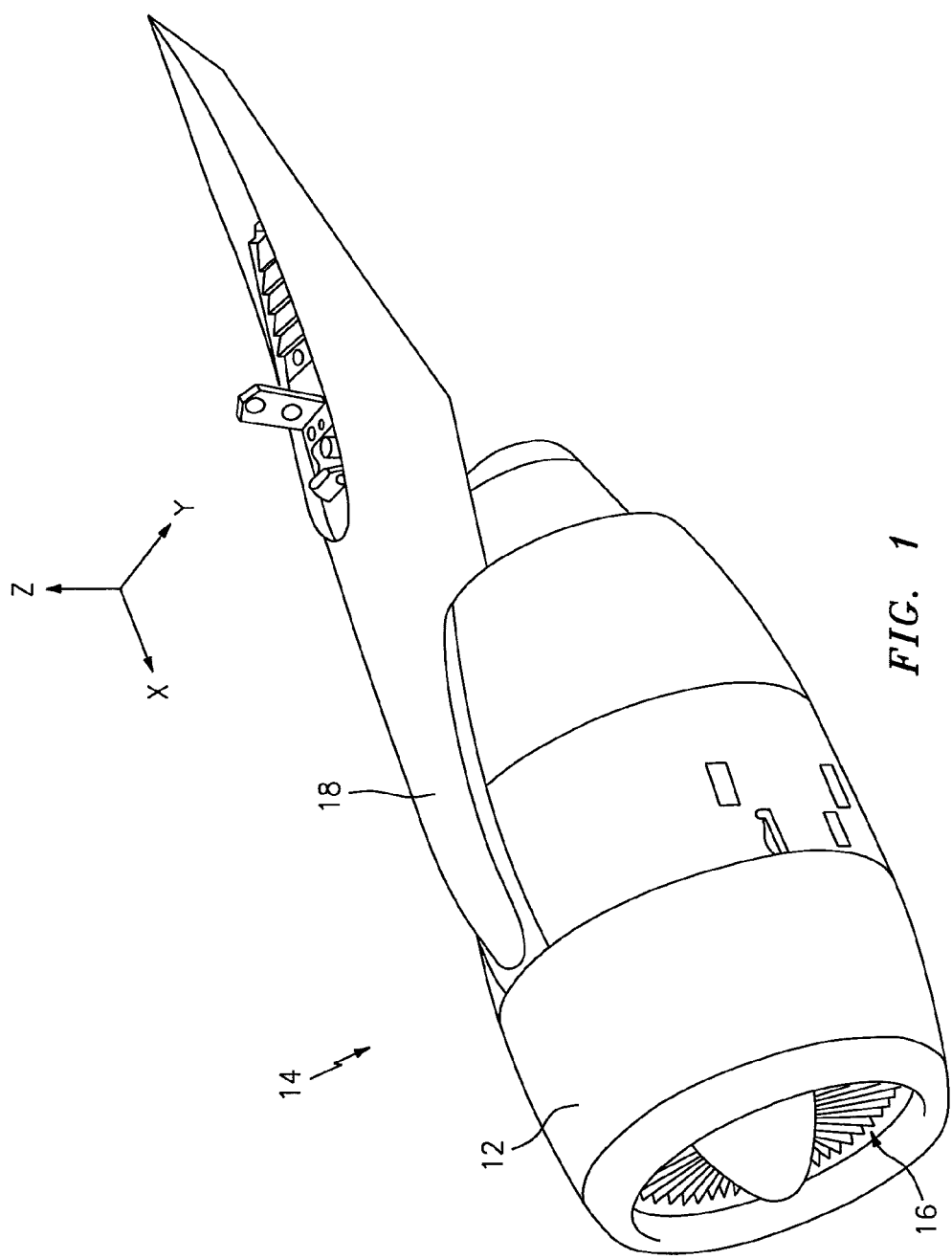
FIG. 1 is a perspective view of a propulsion system.

The present disclosure describes embodiments of a fan ramp 10 (see FIGS. 3-6), and embodiments of a nacelle 12 (see FIGS. 1-6) that include the fan ramp 10. The present disclosure describes aspects of the present invention with reference to the embodiments illustrated in the drawings; however, aspects of the present invention are not limited to the embodiments illustrated in the drawings. The present disclosure may describe one or more features as having a length extending relative to a x-axis, a width extending relative to a y-axis, and/or a height extending relative to a z-axis. The drawings illustrate the respective axes.

The present disclosure uses the terms "circumferential", "annular", "abut", and variations thereof, to describe one or more features. The term "circumferential", and variations thereof, are used herein to indicate that a feature extends along a curve that is centered about an axis of rotation. The term "annular", and variations thereof, are used herein to indicate that a feature is at least partially in the form of a ring (e.g., a ring in a circular shape or another shape). The term "abut", and variations thereof, are used herein to indicate either that a first feature is in direct contact with a second feature, or that a first feature is almost in direct contact with a second feature and is separated from the second feature only by one or more small gaps that extend there between.

Figure 2:
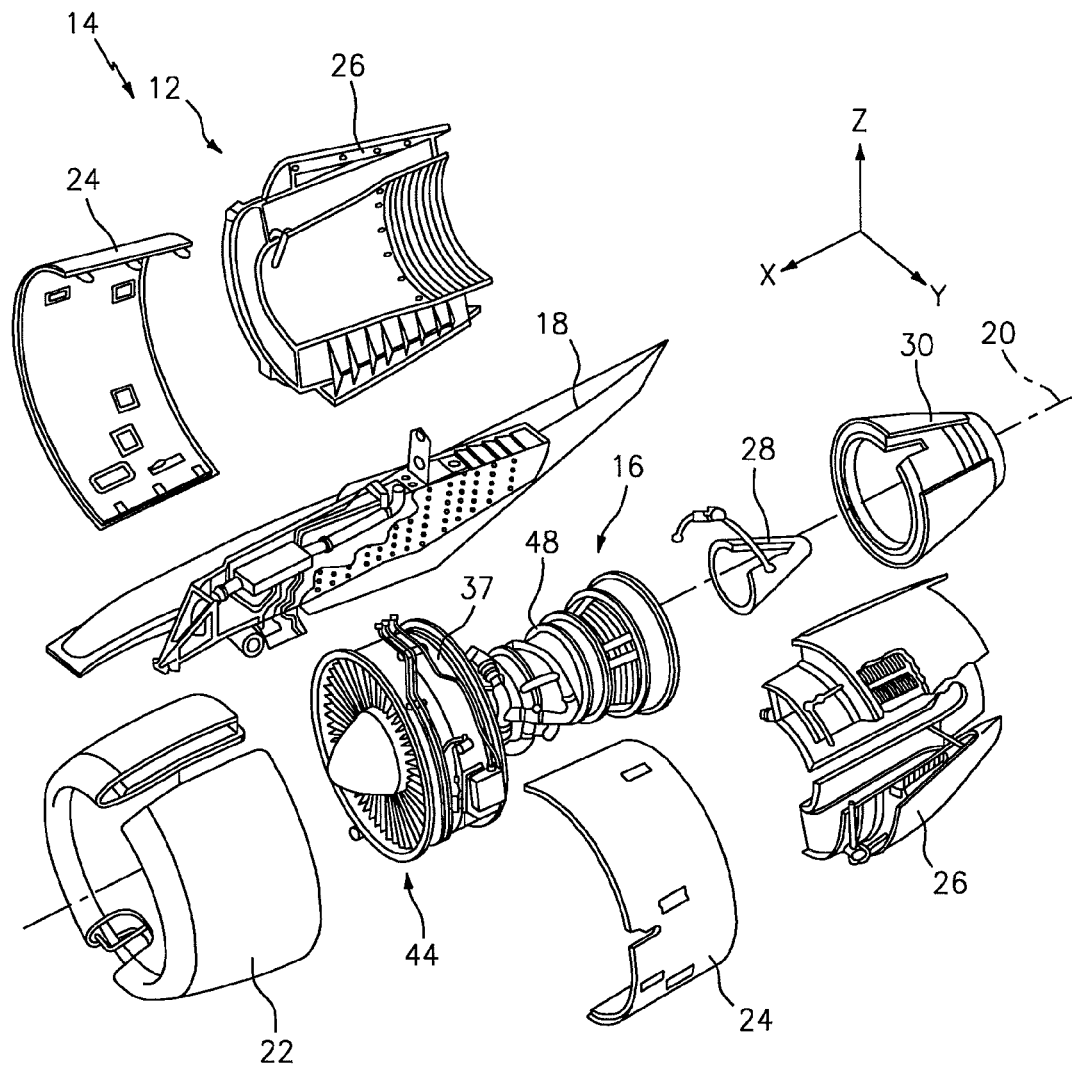
FIG. 2 is an exploded perspective view of the propulsion system of FIG. 1.

Referring to FIGS. 1 and 2, the fan ramp 10 (see FIGS. 3-6) is included in a nacelle 12, and the nacelle 12 is included in a propulsion system 14. The propulsion system 14 and the nacelle 12 can be configured in various different ways. In the embodiment illustrated in FIG. 1, the propulsion system 14 includes is a turbofan type propulsion system that includes a gas turbine engine 16 and a pylon 18 in addition to the nacelle 12. In the embodiment illustrated in FIG. 2, the gas turbine engine 16 extends in a lengthwise direction along an axial centerline 20; the nacelle 12 partially surrounds the gas turbine engine 16; and the pylon 18 connects the nacelle 12 and the gas turbine engine 16 to the underside of an aircraft wing (not shown). In this embodiment, the nacelle 12 includes an inlet 22, a fan cowl 24, a thrust reverser 26, an exhaust centerbody 28, and an exhaust nozzle 30. In this embodiment, the fan ramp 10 (see FIGS. 3-6) is included in the thrust reverser 26 portion of the nacelle 12.

Figure 3:
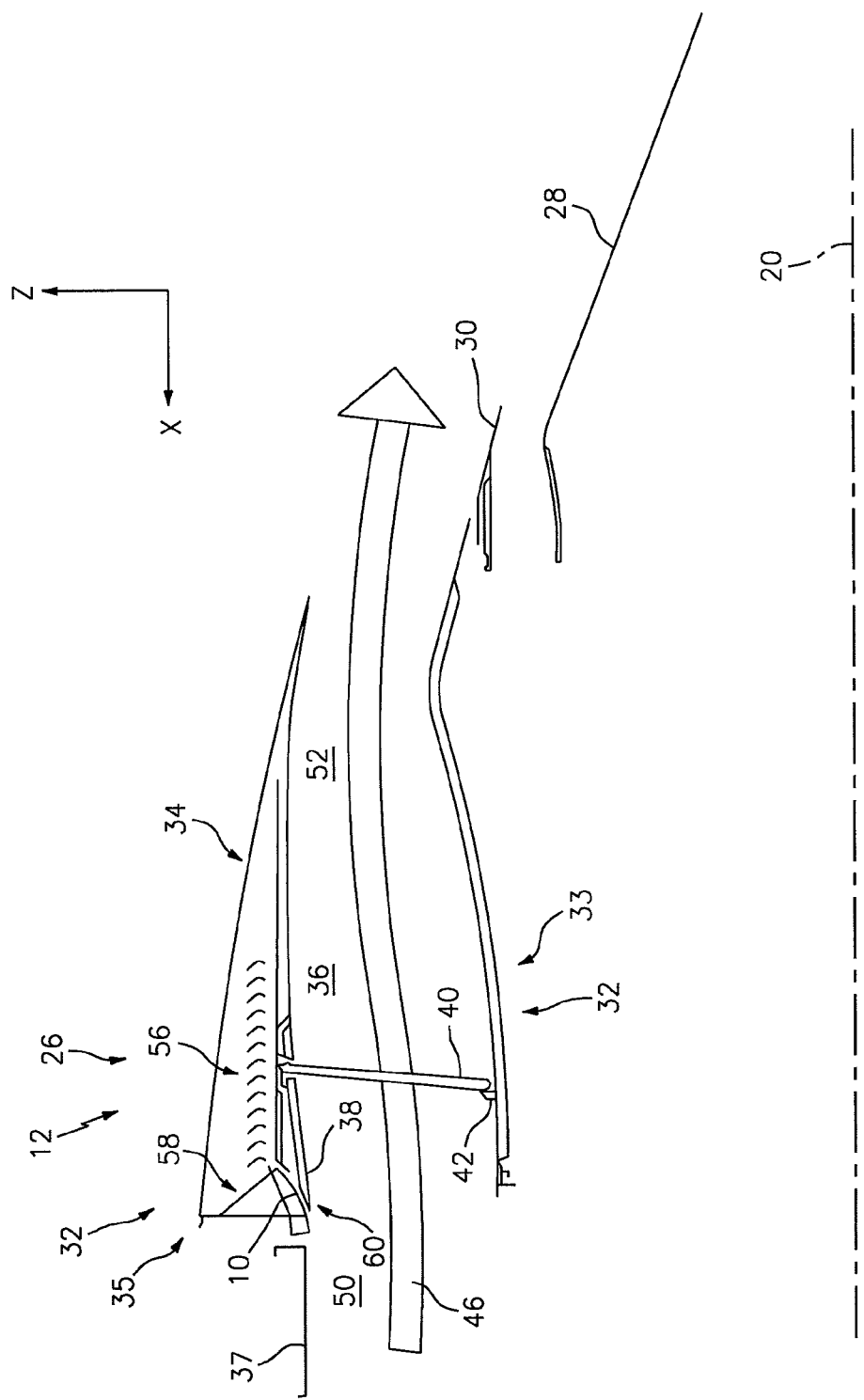
FIG. 3 is a sectional schematic view of the thruster reverser, the exhaust centerbody, and the exhaust nozzle portions of the nacelle that is included in the propulsion system of FIG. 1.
Figure 4:
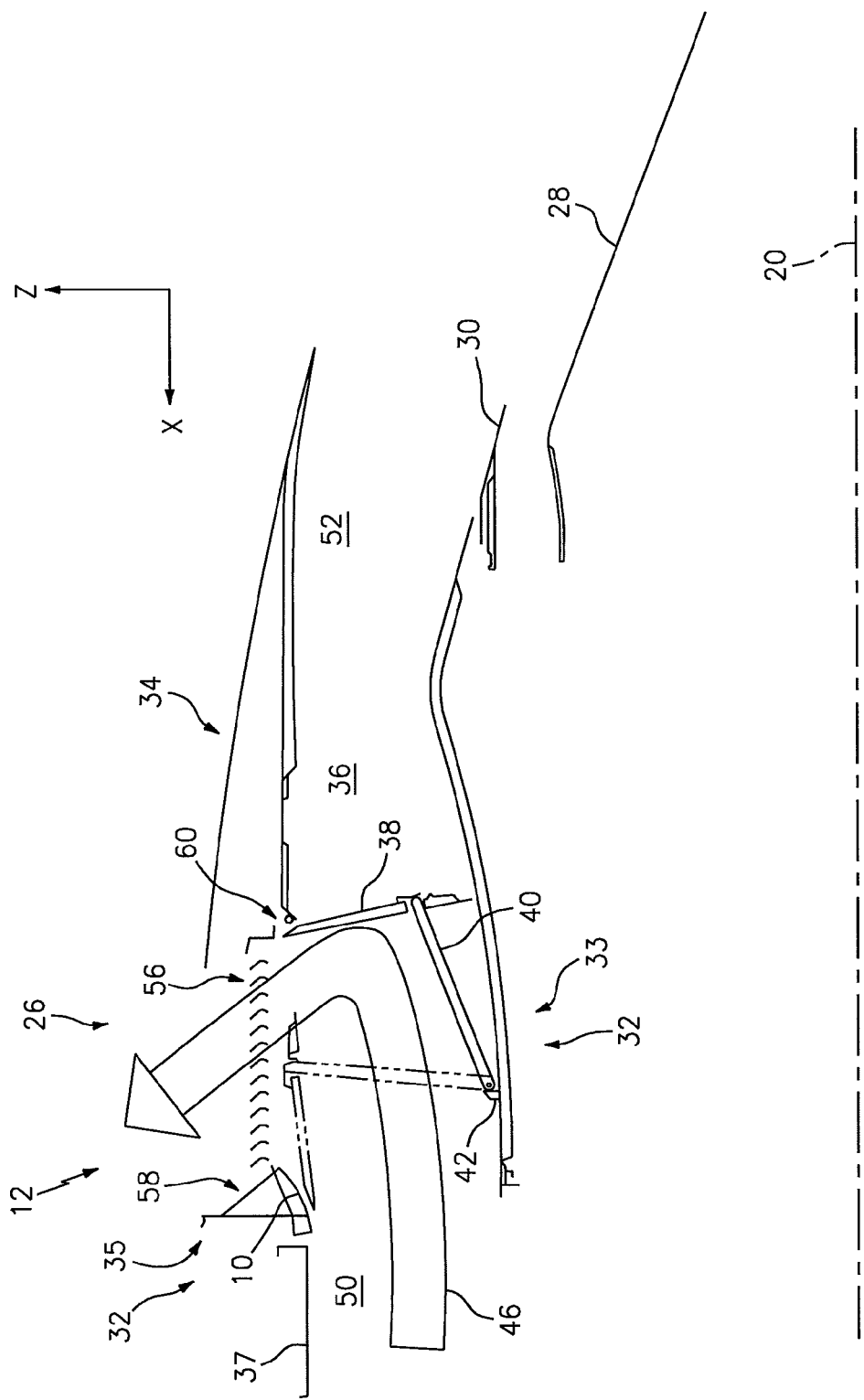
FIG. 4 is a sectional schematic view of the thruster reverser, the exhaust centerbody, and the exhaust nozzle portions of the nacelle that is included in the propulsion system of FIG. 1.

Referring now to FIGS. 3 and 4, in this embodiment the thrust reverser 26 is a cascade type thrust reverser that includes a fixed structure 32 and a translating structure 34; the fixed structure 32 and the translating structure 34 partially define a bypass duct 36; the bypass duct 36 extends circumferentially about the centerline 20; the fixed structure 32 includes a radially inner portion 33 and a radially outer portion 35; the radially outer portion 35 of the fixed structure 32 extends axially from the aft end of a fan case 37 that surrounds the fan section 44 of the gas turbine engine 16 (see FIG. 2); the translating structure 34 is selectively moveable in a generally lengthwise direction relative to the fixed structure 32, between a stowed position (see FIG. 3) (e.g., during a forward thrust operation) and a deployed position (see FIG. 4) (e.g., during a thrust reversing operation); the translating structure 34 engages a track of an upper track beam (not shown) and a track of a lower track beam (not shown) in a manner that permits the movement of the translating structure 34 between the stowed position (see FIG. 3) and the deployed position (see FIG. 4); the track of the upper track beam (not shown) extends in a generally lengthwise direction along an upper area of the nacelle 12 (shown in FIGS. 3 and 4); the track of the lower track beam (not shown) extends in a generally lengthwise direction along a lower area of the nacelle 12 (not shown in FIGS. 3 and 4); the translating structure 34 includes a plurality of blocker doors 38, each of which is pivotably connected to the radially inner portion 33 of the fixed structure 32 by a drag link 40 and a drag link fitting 42; each of the blocker doors 38 is moveable between a stowed position (see FIG. 3) (e.g., during a forward thrust operation of the nacelle 12) and a deployed position (see FIG. 4) (e.g., during a thrust reversing operation of the nacelle 12); the blocker doors 38 are configured to be in their respective stowed positions (see FIG. 3) when the translating structure 34 is in its stowed position (see FIG. 3); the blocker doors 38 are configured to be in their respective deployed positions (see FIG. 4) when the translating structure 34 is in its deployed position (see FIG. 4); when the blocker doors 38 are in the respective stowed positions (see FIG. 3), the blocker doors 38 are positioned proximate the translating structure 34 and each blocker door 38 extends in a direction that is generally parallel to the centerline 20; when the blocker doors 38 are in the respective deployed positions (see FIG. 4), the blocker doors 38 are positioned away from the translating structure 34 and each blocker door 38 extends in a direction that is generally perpendicular to the centerline 20. FIGS. 3 and 4 illustrate the relative positioning of the fan case 37, and the thrust reverser 26, the exhaust centerbody 28, and the exhaust nozzle 30 portions of the nacelle 12. In the embodiment illustrated in FIGS. 3 and 4, a forward edge 60 of each blocker door 38 is convexly curved (see FIG. 6) so that each blocker door 38 can form a relatively tight fit to the curvature of the bypass air duct 36 when each blocker door 38 is in its respective deployed position (see FIG. 4).

Referring back to FIG. 2, during operation of the propulsion system 14 in this embodiment, an airstream (not shown) enters the gas turbine engine 16 through a fan section 44 that is located at a forward end of the gas turbine engine 16; and the airstream is thereafter divided into at least a core airstream (not shown) and a bypass airstream 46 (see FIGS. 3 and 4). In this embodiment, the core airstream enters the gas turbine engine 16, where it is accelerated; the core airstream is then discharged through an aft end of the gas turbine engine 16; and the core airstream is then finally discharged through the exhaust nozzle 30 portion of the nacelle 12 to provide forward thrust. In the embodiment illustrated in FIGS. 3 and 4, when the translating structure 34 is in its stowed position (see FIG. 3), the bypass airstream 46 can pass from a forward end 50 of the bypass duct 36 to an aft end 52 of the bypass duct 36, through which it can be discharged to provide forward thrust; the drag links 40 each block only a small circumferential portion of the bypass duct 36, and thus the bypass airstream 46 can pass around them relatively easily; and the translating structure 34 covers an array of cascades 56 that are included in the radially outer portion 35 of the fixed structure 32 of the thrust reverser 26, thereby blocking the bypass airstream 46 from passing through the array of cascades 56. In this embodiment, when the translating structure 34 is in its deployed position (see FIG. 4), the array of cascades 56 is exposed; and the blocker doors 38 are deployed to redirect substantially all of the bypass airstream 46 toward the array of cascades 56, through which the bypass airstream 46 can be discharged to generate reverse thrust. In this embodiment, the array of cascades 56 extend circumferentially about the centerline 20 of the gas turbine engine 16.

The fan ramp 10 is an aerodynamic surface that is active during a thrust reversing operation of the nacelle 12 (e.g., when the translating structure 34 is in its deployed position and the blocker doors 38 are in their respective deployed positions (see FIG. 4)). The fan ramp 10 can be formed on and/or defined by various different components of the nacelle 12. In some embodiment, the fan ramp 10 can be formed on and/or defined by one or more components of the radially outer portion 35 of the fixed structure 32 of the thrust reverser 26. In the embodiment illustrated in FIGS. 3 and 4, the fan ramp 10 is defined by an annular torque box 58, which is a component of the radially outer portion 35 of the fixed structure 32 of the thrust reverser 26. In this embodiment, the fan ramp 10 is disposed immediately forward of the array of cascades 56 such that the fan ramp 10 extends between an aft end of the fan case 37 and a forward end of the array of cascades 56. In this embodiment, when the blocker doors 38 of the translating structure 34 are in their respective stowed positions (see FIG. 3), the forward edge 60 of each blocker door 38 abuts the fan ramp 10; and when the blocker doors 38 of the translating structure 34 are in their respective deployed positions (see FIG. 4), the fan ramp 10 is exposed to the bypass airstream 46 that passes through the bypass duct 36. In this embodiment, when the blocker doors 38 of the translating structure 34 are in their respective deployed positions (see FIG. 4), the fan ramp 10 aids in guiding the bypass airstream 46 to make a radially outward turn from the bypass duct 36 through the array of cascades 56.

The fan ramp 10 can be configured in various different ways. In the embodiment illustrated in FIGS. 5 and 6, the fan ramp 10 extends circumferentially about an axial fan ramp centerline 62; the fan ramp 10 is disposed relative to the gas turbine engine 16 such that the fan ramp centerline 62 is aligned with the centerline 20 of the gas turbine engine 16; and the fan ramp 10 extends axially between a fan ramp forward edge 66 and a fan ramp aft edge 68. In this embodiment, the fan ramp forward edge 66 is disposed proximate the aft end of the fan case 37; and the fan ramp aft edge 68 is disposed proximate the forward end of the array of cascades 56.

Figure 5:
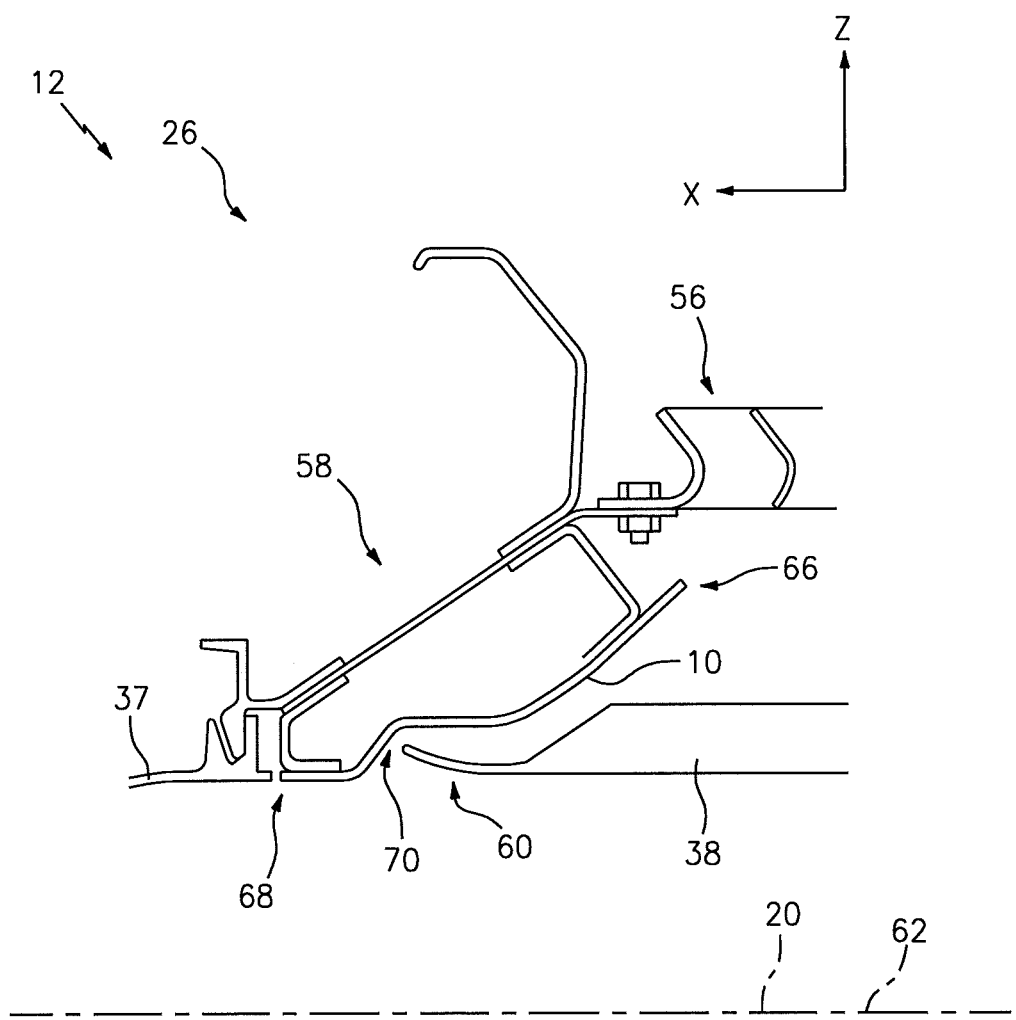
FIG. 5 is a sectional view of the thruster reverser portion of the nacelle that is included in the propulsion system of FIG. 1.
Figure 6:
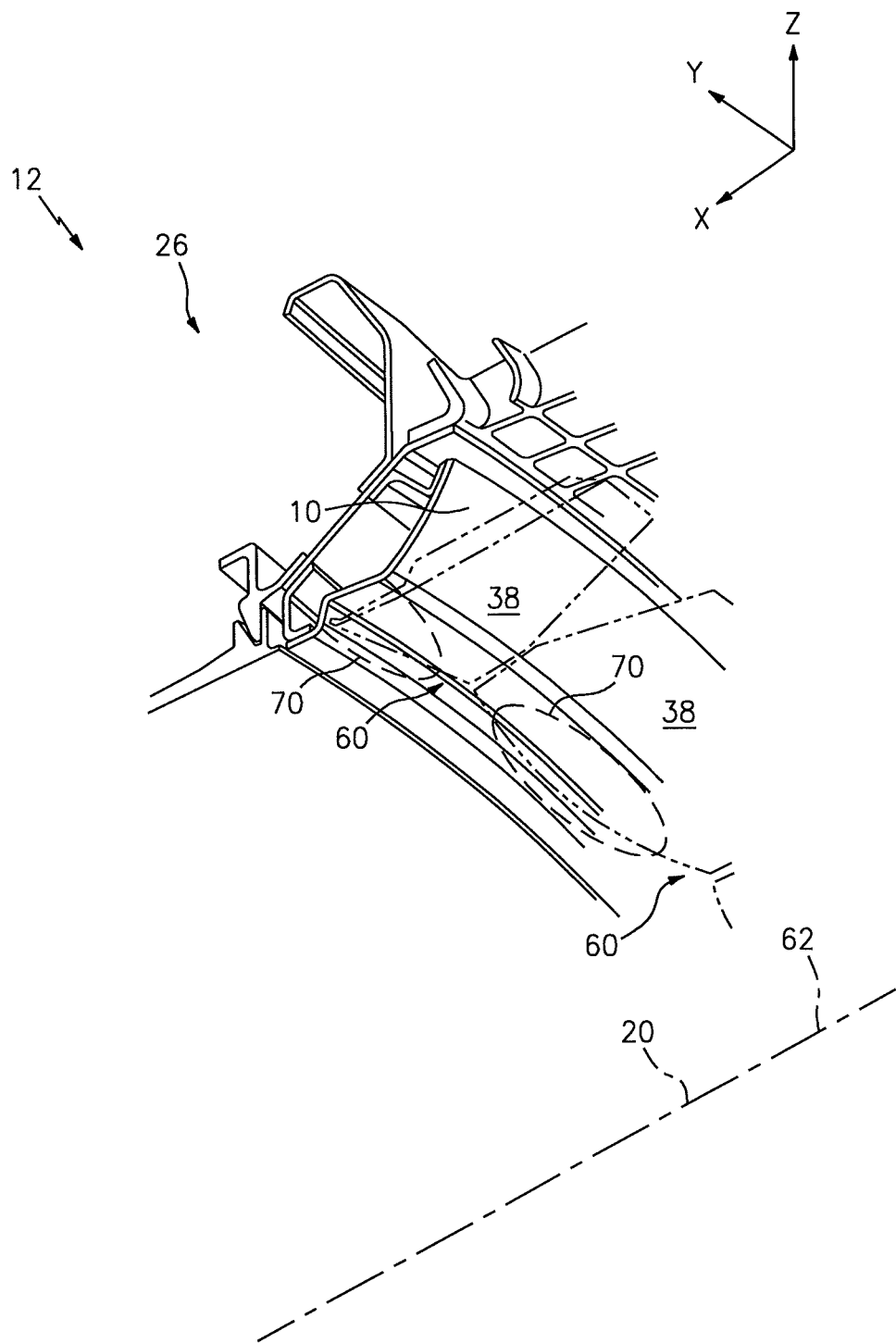
FIG. 6 is a perspective view of the thruster reverser portion of the nacelle that is included in the propulsion system of FIG. 1.

Referring now to FIG. 5, the fan ramp 10 includes at least one blocker door pocket 70. The blocker door pocket 70 is configured to receive at least a portion of a forward edge 60 of a blocker door 38 when the blocker door 38 is in its stowed position. In the embodiment illustrated in FIG. 6, the blocker door pocket 70 is configured to receive a center portion of the forward edge 60 of a blocker door 38 when the blocker door 38 is in its stowed position. In other embodiments not shown in the drawings, the blocker door pocket 70 is configured to receive at least substantially all of the forward edge 60 of a blocker door 38 when the blocker door 38 is in its stowed position.

The blocker door pocket 70 can be configured in various different ways. In some embodiments, the blocker door pocket 70 is a depression that extends in at least one of a radially outward direction and an axially forward direction. In the embodiment illustrated in FIG. 5, for example, the blocker door pocket 70 is a depression that extends in both a radially outward direction and an axially forward direction. The number of blocker door pockets 70 included in the fan ramp 10 can vary. In some embodiments, the number of blocker door pockets 70 can correspond to the number of blocker doors 38 included in the translating structure 34 of the thrust reverser 26. In some embodiments in which the fan ramp 10 includes more than one blocker door pocket 70, including the embodiment illustrated in FIG. 6, the blocker door pockets 70 are circumferentially spaced from one another.

As discussed above, when the blocker doors 38 of the translating structure 34 are in their respective stowed positions, the forward edge 60 of each blocker door 38 abuts the fan ramp 10, and the at least one blocker door pocket 70 included in the fan ramp 10 is configured to receive at least a portion of a forward edge 60 of a blocker door 38. The blocker door pocket 70 is therefore operable to reduce or eliminate any gaps that might otherwise extend between the forward edge 60 of the blocker door 38 and the fan ramp 10 when the blocker door 38 is in its stowed position.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A thrust reverser comprising:
   a first blocker door; and
   a fan ramp for use in a thrust reverser portion of a nacelle, the nacelle being included in a propulsion system, the fan ramp extending circumferentially about an axial fan ramp centerline, the fan ramp comprising:
   a forward edge disposed proximate an aft end of a fan case, the fan case at least partially surrounding a fan section of a gas turbine engine;
   an aft edge disposed proximate a forward end of an array of cascades, the array of cascades being operable to permit a bypass airstream to pass there-through during a thrust reversing operation;
   a first blocker door pocket operable to receive a center portion of a forward edge of a first blocker door included in the nacelle that is configured to redirect the bypass airstream toward the array of cascades during the thrust reversing operation;
   a second blocker door pocket circumferentially spaced from the first blocker door pocket, the second blocker door pocket being operable to receive a portion of a forward edge of a second blocker door included in the nacelle; and a third blocker door pocket circumferentially spaced from the first blocker door pocket, the third blocker door pocket being operable to receive a portion of a forward edge of a third blocker door included in the nacelle;

wherein the forward edge of the first blocker door follows a convex curvature as the forward edge of the first blocker door extends laterally between opposing first and second lateral sides of the first blocker door, the first lateral side is next to the second blocker door, and the second lateral side is next to the third blocker door;

a first side portion of the forward edge of the first blocker door is outside of the first blocker door pocket when the center portion is received within the first blocker door pocket; and wherein the center portion is disposed circumferentially between and circumferentially separates, relative to the axial fan ramp centerline, the first side portion and a second side portion of the forward edge of the first blocker door.

2. The thrust reverser of claim 1, wherein the fan ramp is an aerodynamic surface that is active during the thrust reversing operation.

3. The thrust reverser of claim 1, wherein the fan ramp is exposed to the bypass airstream passing through a bypass duct of the propulsion system during the thrust reversing operation.

4. The thrust reverser of claim 3, wherein the fan ramp aids in guiding the bypass airstream to make a radially outward turn from the bypass duct through the array of cascades during the thrust reversing operation.

5. The thrust reverser of claim 1, wherein the axial fan ramp centerline is aligned with an axial centerline of the gas turbine engine included in the propulsion system.

6. The thrust reverser of claim 1, wherein the first blocker door pocket is a depression extending in a radially outward direction relative to the axial fan ramp centerline.

7. The thrust reverser of claim 1, wherein the first blocker door pocket is a depression extending in an axially forward direction relative to the axial fan ramp centerline.

8. A thrust reversing nacelle for a turbofan propulsion system, the thrust reversing nacelle extending circumferentially about an axial centerline, the thrust reversing nacelle comprising:

an array of cascades extending circumferentially about the axial centerline;

a translating structure operable to be moved in an axial direction between a stowed position, in which the translating structure blocks a bypass airstream from passing from a bypass duct through the array of cascades, and a deployed position, in which the translating structure permits the bypass airstream to pass from the bypass duct through the array of cascades;

a blocker door pivotally mounted to the translating structure, and operable to be moved between a stowed position, in which the blocker door is positioned adjacent to the translating structure and is extending generally parallel to the axial centerline, and a deployed position, in which the blocker door is positioned away from the translating structure and is extending generally perpendicular to the axial centerline to aid in guiding the bypass airstream from the bypass duct through the array of cascades;

a fan ramp operable to aid in guiding the bypass airstream from the bypass duct through the array of cascades when the translating structure and the blocker door are in their respective deployed positions, the fan ramp including a blocker door pocket operable to receive a first portion of a forward edge of the blocker door, wherein a second portion of the forward edge of the blocker door is outside of the blocker door pocket when the first portion is received by the blocker door pocket;

wherein the blocker door includes a surface configured to form an outer peripheral portion of the bypass duct when the blocker door is in the stowed position, the surface extends longitudinally along a length of the blocker door between the forward edge and an aft edge of the blocker door, and the surface extends laterally along a width of the blocker door between opposing first and second sides of the blocker door; and wherein the second portion of the forward edge projects laterally out from the first portion of the forward edge to the first side of the blocker door.

9. The thrust reversing nacelle of claim 8, wherein the fan ramp extends between a forward fan ramp edge and an aft fan ramp edge, wherein the forward fan ramp edge is disposed proximate an aft end of a fan case and the aft fan ramp edge is disposed proximate a forward end of the array of cascades.

10. The thrust reverser of claim 1, wherein the second side portion of the forward edge of the first blocker door is not received within the first blocker door pocket.

11. The thrust reverser of claim 1, wherein the second side portion of the forward edge of the first blocker door is outside of the first blocker door pocket.

12. A thrust reverser comprising:

a first blocker door; and a fan ramp for a thrust reverser portion of a nacelle for an aircraft propulsion system, the fan ramp extending circumferentially about an axial centerline, and the fan ramp comprising:

a forward edge disposed proximate an aft end of a fan case, the fan case at least partially surrounding a fan section of a gas turbine engine;

an aft edge disposed proximate a forward end of an array of cascades, the array of cascades being operable to permit a bypass airstream to pass there-through during a thrust reversing operation;

a first blocker door pocket configured to receive a center portion of a forward edge of the first blocker door included in the nacelle, wherein a first side portion of the forward edge of the first blocker door is outside of the first blocker door pocket when the center portion is received within the first blacker door pocket, wherein a second side portion of the forward edge of the first blocker door is outside of the first blocker door pocket when the center portion is received within the first blocker door pocket, and wherein the center portion is disposed circumferentially between and circumferentially separates, relative to the axial centerline, the first side portion and the second side portion.

13. The thrust reverser of claim 12, further comprising a second blocker door pocket configured to receive a first portion of a forward edge of a second blocker door included in the nacelle, wherein a second portion of the forward edge of the second blocker door is outside of the second blocker door pocket when the first portion of the forward edge of the second blocker door is received within the second blocker door pocket.

14. The thrust reversing nacelle of claim 8, wherein a third portion of the forward edge of the blocker door is outside of the blocker door pocket when the first portion is received by the blocker door pocket;

the first portion of the forward edge is disposed laterally between and separates the second portion of the forward edge and the third portion of the forward edge; and the third portion of the forward edge projects laterally out from the first portion of the forward edge to the second side of the blocker door.

15. The thrust reversing nacelle of claim 8, wherein the forward edge of the blocker door follows a convex curvature as the forward edge extends laterally between the first side and the second side.

* * * * *

UNITED STATES PATENT AND TRADEMARK OFFICE
CERTIFICATE OF CORRECTION

PATENT NO. : 9,765,729 B2
APPLICATION NO. : 14/056629
DATED : September 19, 2017
INVENTOR(S) : Aten et al.

Page 1 of 1

It is certified that error appears in the above-identified patent and that said Letters Patent is hereby corrected as shown below:

In the Claims

Column 8, Line 48, Claim 12, please delete "blacker" and insert --blocker--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*